United States Patent [19]

Palmcrantz

[11] 3,937,302

[45] Feb. 10, 1976

[54] OSCILLATING MOVEMENT DAMPING MEANS INTENDED FOR PIVOTALLY SUSPENDED HOISTING GEAR

[75] Inventor: Jan Birger Palmcrantz, Harmanger, Sweden

[73] Assignee: Hiab-Foco Aktiebolag, Hudiksvall, Sweden

[22] Filed: Dec. 18, 1974

[21] Appl. No.: 533,796

[30] Foreign Application Priority Data
Dec. 19, 1973 Sweden .......................... 7317130

[52] U.S. Cl. .............................. 188/1 B; 188/130
[51] Int. Cl.² ............................................ F16F 7/08
[58] Field of Search ......... 74/574; 188/1 B, 83, 129, 188/130

[56] References Cited
UNITED STATES PATENTS

| | | | |
|---|---|---|---|
| 2,318,873 | 5/1943 | Mallory | 188/130 |
| 2,445,613 | 7/1948 | Fincher | 188/1 B X |
| 2,647,591 | 8/1953 | Young | 188/1 B |

*Primary Examiner*—Duane A. Reger
*Attorney, Agent, or Firm*—Newton, Hopkins & Ormsby

[57] ABSTRACT

A means to damp the oscillating movements of a hoisting device suspended in a link the upper end of which pivotally mounted about a first horizontal shaft on the outer end of a crane jib and at the lower end of which the hoisting device is pivotally mounted about a second horizontal shaft. A sector-shaped brake disc is mounted at the upper articulation point, the centre of said disc being situated in or close to the centre of said first shaft. At least one brake shoe is provided at the crane jib and arranged to be pressed against the disc at a distance from said first shaft, whereby the desired damping effect is obtained.

11 Claims, 4 Drawing Figures

OSCILLATING MOVEMENT DAMPING MEANS INTENDED FOR PIVOTALLY SUSPENDED HOISTING GEAR

BACKGROUND OF THE INVENTION

The present invention concerns an improved means intended to damp the oscillating movements of hoisting mechanisms suspended in a link the upper end of which is pivotally mounted about a first horizontal shaft on the outer end of e.g. a crane jib and at the lower end of which the hoisting mechanism is pivotally mounted about a second horizontal shaft, the vertical longitudinal medium plane of which forms an angle, preferably a right angle, to the vertical longitudinal medium plane of the first shaft.

The hoisting device may be in the form of a gripping means which is largely used in logging and other forestry operations in connection with vehicle mounted cranes for loading and unloading timber and similar work. In order that the gripper jaws, when spread apart, be able to efficiently find their way between the logs in a log pile and then grab as large a number thereof as possible, the gripper must be pivotally suspended so as to be able to move in one or several directions. Such hoisting gear, when freely suspended, will however easily start oscillating during the crane jib operations. Also when the crane jib movements have ceased, the hoisting gear continues to oscillate on account of its cardanic suspension. The oscillation or pendulum system possesses such inertia that it takes considerable time before the oscillations die away, which considerably delays the work.

Various solutions have been suggested to diminish the time of oscillating. In accordance with one suggestion telescopic shock absorbers are inserted between the crane jib and the hoisting device. However, shock absorbers are liable to damage during loading operations. In addition, they considerably limit the angular deflections or swings of the hoisting device.

In accordance with another suggested solution the cardan link joints are provided with a friction lining, e.g. in the form of rubber bushings provided at the link hub. The rubber is biased through axial compression. One disadvantage of this type of damper means is that the compression pressure must be reset from time to time. Because the damper means is arranged about the rotational shafts of the cardan link, the frictional force will act with a comparatively small leverage to the centre of rotation. The braking moment consequently will be relatively small. In addition, the angular speed of the pendulum becomes low. The damper acts close to the area of static friction, which results in considerable wear.

SUMMARY OF THE INVENTION

The purpose of the present invention is to remedy the above-mentioned drawbacks and deficiencies. The invention is characterised in that at the articulation point about the upper articulation shaft, one of the pivoted members, preferably the link, in which the hoisting device is suspended, is provided with a sector-shaped brake disc having its centre in or close to the centre of this shaft, and that the other pivoted member, preferably the crane jib, is provided with at least one brake shoe arranged through the action of a spring to be pressed against the brake disc at a distance from the shaft. The damping effect will be extremely good in that the brake shoe is positioned comparatively far from the articulation shaft. The damping means does not affect the articulation shaft in which the hoisting device is suspended, which means that the simple mounting of the hoisting device to the crane may be retained while at the same time it becomes possible to use the hoisting device with or without damping, according to choice. The means enjoys a long operational life. No subsequent adjustment of the tension spring of the brake shoe or shoes is necessary. Damping may be effected in one or two vertical planes forming an angle between them.

BRIEF DESCRIPTION OF THE DRAWINGS

Further characteristics of the invention will appear from the following description with reference to the accompanying drawings, wherein.

DETAILED DESCRIPTION OF A PREFERRED EMBODIMENT

Figure 1:
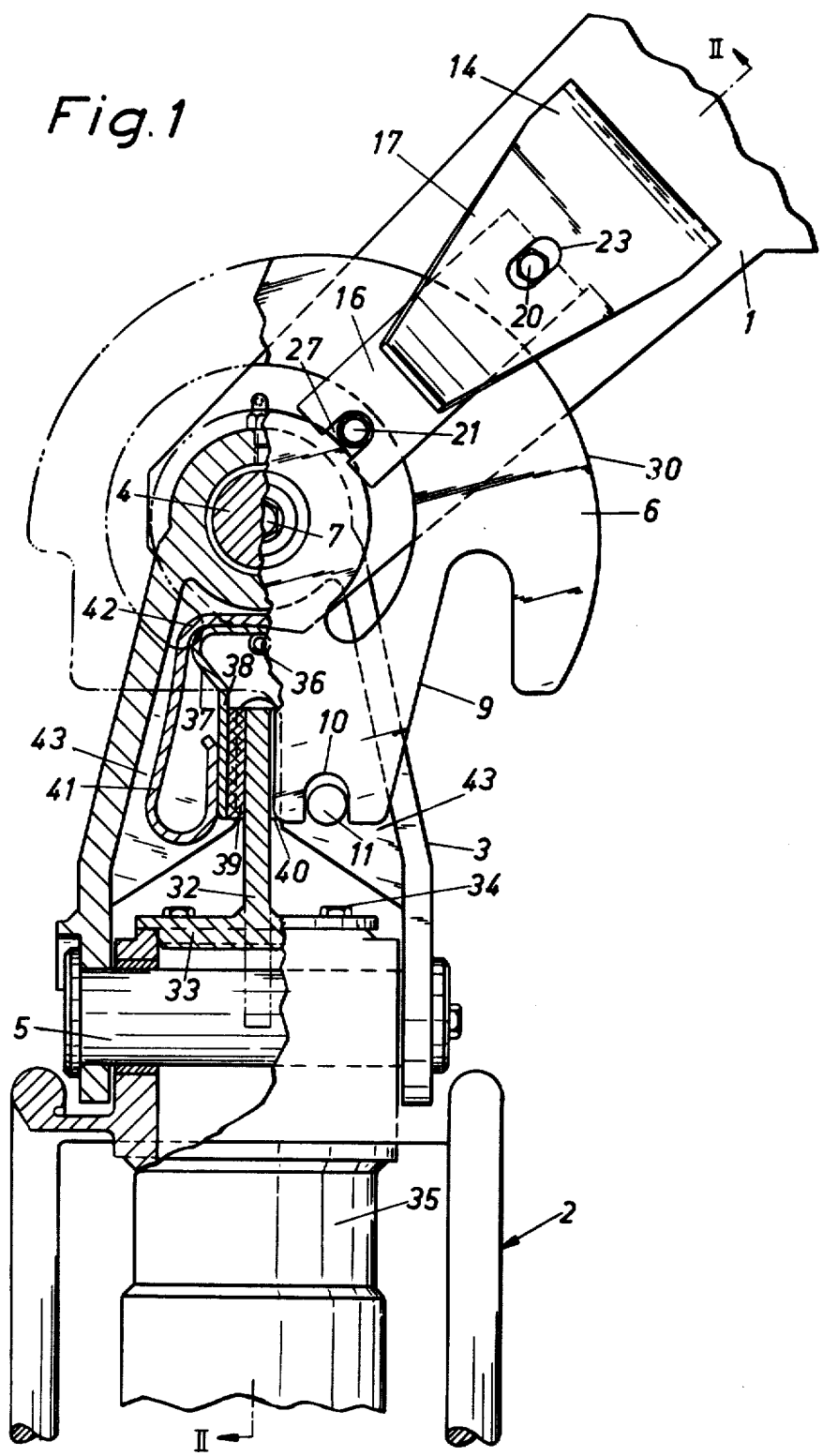
FIG. 1 is a partly vertical sectional view through an oscillating movement damping means provided at the link between the outer end of a crane jib and the hoisting device suspended therein via a link.

In the drawings is illustrated the outer end of a crane jib 1 which is mounted for swinging movement in various directions upwards and downwards as well as in the lateral directions, the upper end of a hoisting device 2, and a link 3 arranged between the crane jib and the hoisting device. A horizontal shaft 4 articulates the upper link end to the crane jib 1, and a second horizontal shaft 5 positioned in a vertical plane different from that of shaft 4, hingedly interconnects the link with the hoisting device 2. Through the arrangement of these two shafts 4, 5 the hoisting device 2 becomes suspended in a cardan fashion so as to be able to oscillate in various directions. Oscillating movement damping means in accordance with the invention are provided at both pivot points.

The upper oscillating movement damping means comprises a brake disc 6 secured to one end of the shaft 4 by means of a bolt 7 and a bushing 8. The brake disc 6 is formed with a downwardly directed arm 9 having a notch 10 in which engages a follower shoulder 11 formed on the link 3. Brake shoes 12, 13 are arranged to exert a pressure against both sides of the brake disc 6. The brake shoe 12 is mounted on one side of one 15 of the members of a yoke spring 14. The other brake shoe 13 is arranged on one face of a holder arm 16 against the opposite face of which abuts the other leg member 17 of the yoke spring 14 while exerting a pressing action. In one side face of the crane jib 1 are secured two bolts 20 and 21, respectively, each one supporting a distance sleeve 18 and 19. The distance sleeve 18 passes with abundant play through two openings 22, 23 formed in the yoke members 15 and 17, respectively, and the distance sleeve 19 passes, likewise with abundant play, through a notch 24 in the yoke spring leg member 15 and through an arc-shaped groove 25 formed in the brake disc 6. In addition, the sleeve 18 passes freely through a notch 26 formed in the upper end of the holder arm 16, and the sleeves 19 passes freely through a notch 27 formed in the lower end of the arm 16.

Upon swinging movement of the link 3 together with the hoisting device 2 about shaft 4, the brake disc 6 is also set in motion, thus sliding between the brake shoes 12 and 13 which the spring leg members 15 and 17 urge against the brake disc from mutually opposite directions. The brake shoes 12, 13 as well as the yoke spring 14 and the holder arm 16 are prevented from taking part in the movements of the brake disc 6 by the bolts 20, 21. This creates a powerful damping effect. The braking force proper which is imagined to attack centrally on the braking shoes 12, 13 acts at a considerable distance away from the shaft 4.

Figure 3:
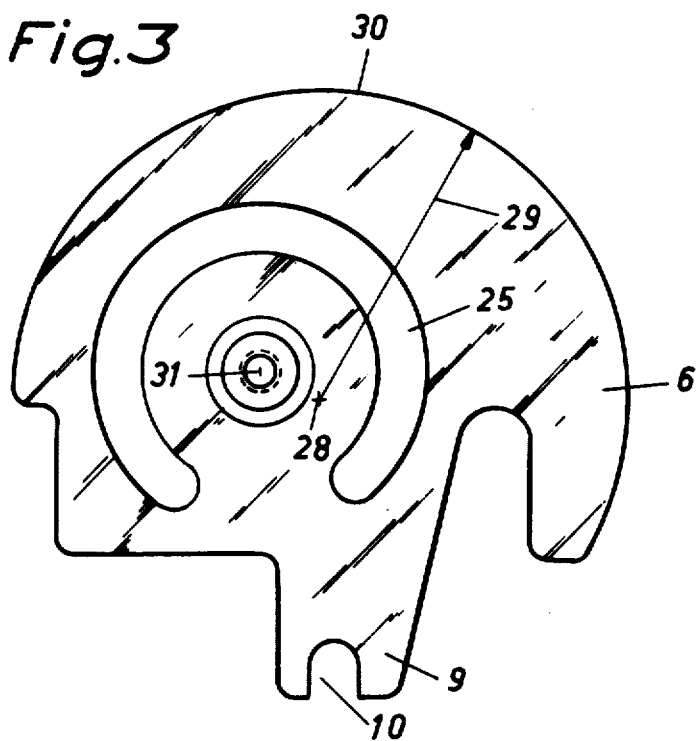
FIG. 3 is a side view of the brake disc incorporated in the upper articulation point.
Figure 4:
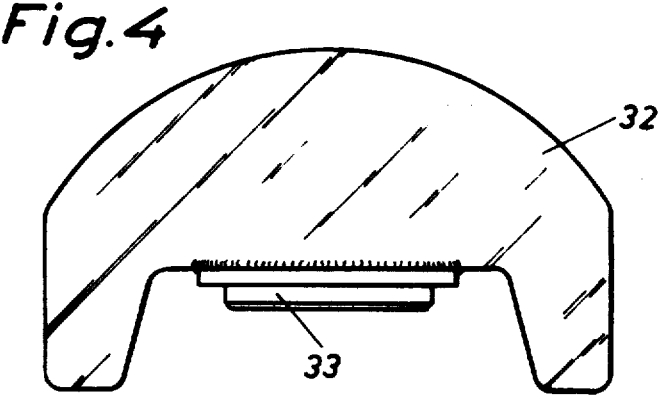
FIG. 4 is a brake disc incorporated in the lower articulation point.

As appears from FIGS. 1 and 3 the centre 28 of the radius 29 to the peripheral edge 30 of the brake disc 6 does not agree with the centre 31 of the shaft 4. This means that when the link 3 together with the brake disc 6 are swung in the clockwise direction, a considerable portion of the active area of the brake shoes 12, 13 will be positioned beyond the edge 30. Upon such lateral swinging movement of the link 3 together with the brake disc 6 the braking force consequently will act on a shorter lever to the centre 31 than when the link 3 together with the brake disc 6 are swung in the opposite direction. Through this arrangement it thus becomes possible according to desire and as determined by existing need and necessity to obtain a varying braking action and thus differing oscillating movement damping effects upon oscillating movements of the link 3 together with the hoisting device 2 in one direction or the other.

The lower pivot point is provided with a damping device which in principle agrees with the one just described. In this case the brake disc 32 is, however, provided with a mounting washer 33 which by means of screws 34 is secured to the upper end of the frame 35 of the hoisting device 2. The brake disc 32 projects into the interior of the link 3. A tubular rivet 36 or similar means supports a yoke-shaped holder 37 therein and at the inner faces of the holder leg members 38 is secured a brake shoe 39, 40 which is pressed by the legs 31 of a yoke-shaped spring 42 against the brake disc 32 from mutually opposite directions. The brake shoes 39, 40, the holder 37 and the yoke spring 42 are retained in position between the two side walls 43 of the link 3 in a manner preventing them from taking part in the swinging or oscillating movements of the brake disc 32 about the shaft 5.

It is evident that upon swinging movement of the hoisting device about the shaft 5, in which movement takes part also the brake disc 32, efficient braking and damping of the oscillating movements occur owing to the arrangement of the brake shoes 39, 40 exerting a pressure on the brake disc 32.

Figure 2:
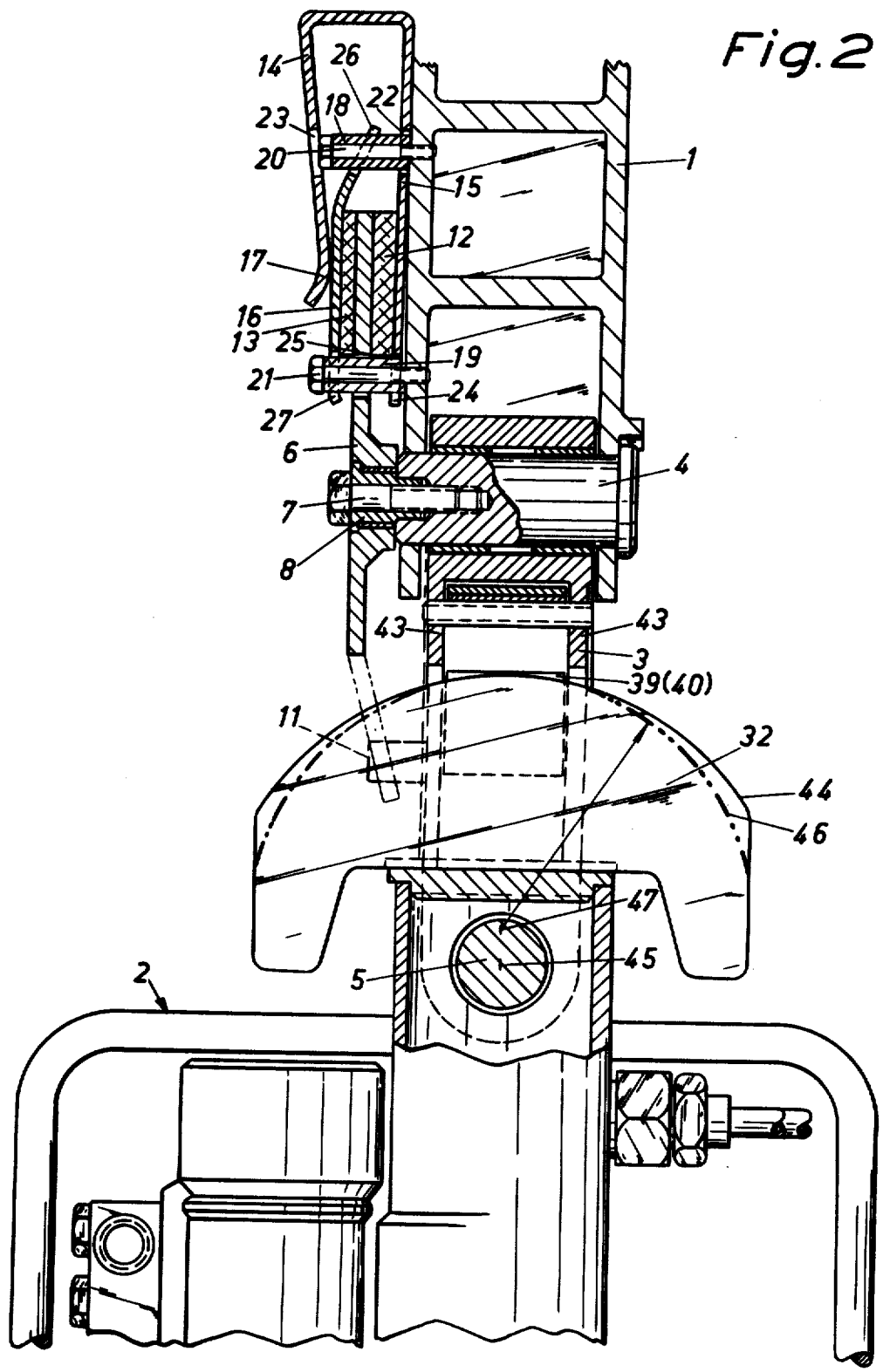
FIG. 2 is a sectional view along line II—II of FIG. 1.

The peripheral edge 44 of the brake disc 32 follows an arc, the centre 45 of which is situated in the shaft 5. The same damping effect is then achieved upon the swing of the hoisting device 2 in both directions. If, on the other hand, the peripheral edge of the brake disc 32 follows a smaller arc 46 (FIG. 2) the centre of which is positioned e.g. in point 47, the damping effect will diminish, the longer the swing of the hoisting device 2 in either direction is.

The embodiment as described and illustrated herein is to be regarded as an example only and the oscillating movement damping means may be constructively altered in a variety of ways within the scope of the invention. The damping means provided at the lower pivoted member may possibly be dispensed with. The oscillating movement damping means may be used for other types of hoisting devices than grippers and be suspended on other lifting means than crane jibs. Each brake disc 6 or 32 may require only one brake shoe 12, 13 or 39, 40, respectively, Approximately the same oscillating movement damping effect is obtained if the brake disc 6 is instead provided on the crane jib 1 and the brake shoes 12, 13 on the link 3. Also at the lower pivot point, shaft 5, the positions of the brake disc 32 and the brake shoes 39, 40 may be reversed.

What I claim is:

1. An improved oscillating movement damping means for a pivotally suspended hoisting device, comprising a link supporting said hoisting device, a first horizontal shaft pivotally mounting the upper end of said link to the outer end of a lifting means, such as crane jib, a second horizontal shaft pivotally mounting said hoisting device to the lower end of said link, the vertical longitudinal medium plane of said second shaft forming an angle, preferably a right angle, to the vertical medium plane of said first shaft, the improvement in which one of the pivoted members is provided with a sector-shaped brake disc at the pivot point of one shaft, said brake disc having its centre approximately in the centre of said one shaft, and the second pivoted member being provided with at least one brake shoe, and a spring arranged to press said brake shoe against said brake disc at a distance from said one shaft.

2. An improved damping means as claimed in claim 1, comprising one brake shoe positioned on each side of said brake disc, said spring being a U-shaped flat spring the leg members of which urge said two brake shoes against said brake disc from mutually opposite directions.

3. An improved damping means as claimed in claim 2, comprising two bolt means arranged on said lifting means at different distances away from said one shaft to prevent said brake shoes from taking part in the rotational movements of said brake disc, said brake disc formed with an arcuate groove in which engages the bolt closest to said one shaft.

4. An improved damping means as claimed in claim 3, comprising an arm supported by the outer one of said brake shoes, said bolts passing through said arm for removable attachment of said arm.

5. An improved damping means as claimed in claim 1, comprising a bolt provided at one end of said one shaft so as to pass through said brake disc centrally thereof, and a follower means provided at the lower one of said two pivoted members, arranged for cooperation with said brake disc to force said brake disc to take part in the swinging movements of said second pivoted member.

6. An improved damping means as claimed in claim 1 provided at the lower one of said two pivot points, the improvement comprising a brake disc provided in the hoisting device frame so as to project upwards into said link, said brake disc being sector-shaped with the centre thereof positioned in the centre of said second shaft, and a yoke-shaped holder means inserted in said link, the leg members of said holder means supporting one brake shoe each, a yoke-shaped flat spring the two legs of which are arranged to urge said brake shoes to press against both sides of said brake disc at a distance from said second shaft.

7. An improved damping means as claimed in claim 6, comprising an elongate member formed in the interior of said link to support said holder yoke, said brake shoes and said yoke spring.

8. An improved damping means as claimed in claim 1, comprising the peripheral edge of said brake disc having such an extension as to permit said brake disc to be positioned radially inside the outer edge of said brake shoes upon relative movement between said brake disc and the associated brake shoe to one end position.

9. An improved damping means as claimed in claim 6, comprising the peripheral edge of said brake disc having such an extension as to permit said brake disc to be positioned radially inside the outer edge of said brake shoes upon relative movement between said brake disc and the associated brake shoe to one end position.

10. In a hoisting device including a load-engaging device, a lifting member, and link means suspending said load-engaging member from said lifting member for substantially universal oscillatory motion with respect thereto, said link means including a link member and shaft pivotally connecting said link member with said lifting member, the combination of:

a brake disc pivoted to and at one end of said shaft and including a sectorial portion radially spaced from said shaft; and friction means carried by one of said members and engaging said sectorial portion of the brake disc, and spring means positively urging said friction means against said sectorial portion of the brake disc;

said brake disc also including an arm extending radially from said shaft, and said arm having means anchoring it to the other of said members whereby oscillatory motion between said members about the axis of said shaft is resisted by relative movement between said brake disc and said friction means.

11. In a hoisting device as defined in claim 10 wherein said sectorial portion overlies said lifting member and is provided with an arcuate slot centered with respect to the axis of said shaft, an anchor member fixed to said lifting member and projecting through said arcuate slot, a further anchor member fixed to said lifting member beyond said sectorial portion, and said spring means comprising a spring clamp assembly engaged with said anchor members, said friction means comprising a pair of brake shoes sandwiching said sectorial portion therebetween and urged toward each other by said spring clamp assembly.

* * * * *